US012566418B2

(12) United States Patent
Lin et al.

(10) Patent No.: US 12,566,418 B2
(45) Date of Patent: Mar. 3, 2026

(54) PROCESSING EQUIPMENT AND ITS CONTROL SYSTEM AND CONTROL METHOD

(71) Applicant: Industrial Technology Research Institute, Hsinchu (TW)

(72) Inventors: Jing-Han Lin, Hsinchu (TW); Chih-Hsuan Shih, Hsinchu (TW); Yuan-Chieh Lo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 370 days.

(21) Appl. No.: 18/307,533

(22) Filed: Apr. 26, 2023

(65) Prior Publication Data

US 2024/0361745 A1     Oct. 31, 2024

(51) Int. Cl.
*G05B 19/00* (2006.01)
*G05B 19/404* (2006.01)

(52) U.S. Cl.
CPC .. *G05B 19/404* (2013.01); *G05B 2219/33099* (2013.01)

(58) Field of Classification Search
CPC .................... G05B 19/404; G05B 2219/33099
See application file for complete search history.

(56) References Cited

U.S. PATENT DOCUMENTS

| | | | |
|---|---|---|---|
| 9,636,827 B2 * | 5/2017 | Sato ........................ | B25J 13/088 |
| 11,132,624 B2 | 9/2021 | Chen et al. | |
| 2024/0094688 A1 * | 3/2024 | Masui .................. | G05B 13/042 |

FOREIGN PATENT DOCUMENTS

| | | | |
|---|---|---|---|
| CN | 1605958 | A | 4/2005 |
| CN | 102479266 | B | 10/2014 |
| CN | 105458878 | A | 4/2016 |
| CN | 104249195 | B | 1/2017 |
| CN | 104972362 | B | 10/2017 |
| CN | 108398922 | B | 2/2021 |
| CN | 109664296 | B | 12/2021 |
| JP | 7014733 | B2 | 2/2022 |
| TW | 519712 | A | 2/2003 |

(Continued)

OTHER PUBLICATIONS

Kuhlenkötter et al.,"A robot system for high quality belt grinding and polishing processes", ResearchGate, Jul. 2005, In book: Cutting Edge Robotics, pp. 755-770.

(Continued)

*Primary Examiner* — Julio C. Gonzalez
(74) *Attorney, Agent, or Firm* — HSML P.C.

(57) ABSTRACT

The present disclosure provides a control system for controlling a processing equipment, and a control method thereof comprises: transmitting a processing signal to a processing unit via an input unit when the processing equipment generates the processing signal for processing a workpiece, so that the processing unit predicts a processing quality of the workpiece according to the processing signal and provides the processing quality as a reference information; and transmitting the reference information to a calculation unit when the processing quality of the workpiece does not meet a requirement, so as to calculate a compensation parameter to automatically adjust a working state of the processing equipment on the workpiece.

21 Claims, 9 Drawing Sheets

(56) References Cited

FOREIGN PATENT DOCUMENTS

| | | |
|---|---|---|
| TW | I656940 B | 4/2019 |
| TW | 202232118 A | 8/2022 |
| TW | 202302269 A | 1/2023 |

OTHER PUBLICATIONS

Kuhlenkötter et al., "Modellierung des Abtrags-verhaltens elastischer-,robotergeführter Schleif-werkzeuge", Springer-Verlag Berlin Heidelberg 1998, ISBN 978-3-540-64787-4, with English translation of the Abstract.
Office Action issued in corresponding Taiwanese Application No. 11221179840, dated Nov. 23, 2023, 8 pages provided.

\* cited by examiner

PROCESSING EQUIPMENT AND ITS CONTROL SYSTEM AND CONTROL METHOD

BACKGROUND

1. Technical Field

The present disclosure relates to a control, and more particularly, to a processing equipment that automatically adjusts operating conditions and a control system thereof and a control method thereof.

2. Description of Related Art

With the rapid development of machine tool automation, it has become the mainstream to use the input of relevant parameters to carry out relevant processing operations. Therefore, computer numeral control (CNC) has been widely used in current machine tools for processing operations.

Furthermore, with the development of advanced manufacturing technology, higher requirements are put forward for the stability and reliability of processing operations such as grinding or polishing.

However, on the production line, it is often determined based on the experience of the operator, and the relevant parameters of the grinding machine are adjusted according to the state presented by the surface roughness of the sample. Therefore, when the grinding machine performs a large amount of processing on the same product, the grinding machine will generate force changes due to machine fatigue, resulting in different roughness on the surface of the product. As a result, there are occasions the operator cannot effectively determine the various force changes and cannot effectively modify the processing parameters in real time, resulting in uneven quality of the entire batch of processed products, which in some cases leads to the entire batch being scrapped.

Therefore, the deficiencies induced accordingly become an issue the industry urgently needs to take care of.

SUMMARY

The present disclosure provides a control system that is applied to a processing equipment, the processing equipment generates a processing signal when processing a workpiece, and the control system comprising: an electronic device; an input unit configured in the electronic device and having a model input information including the processing signal; a correction unit configured in the electronic device and used to determine whether the processing equipment is flat against a surface of the workpiece; a database configured in the electronic device and storing built-in information, so that the correction unit determines whether the model input information is reasonable based on the built-in information; and a target module configured in the electronic device to carry out a compensation operation of the processing equipment, and including a processing unit communicatively connected to the input unit and a calculation unit communicatively connected to the processing unit, so that the input unit provides the model input information to the processing unit for the processing unit to predict a processing quality of the workpiece according to the model input information and provides the processing quality as a reference information, and the calculation unit calculates a target parameter that is required according to the reference information to calculate a compensation parameter to form a target information including the compensation parameter.

The present disclosure further provides a processing equipment, comprising: the aforementioned control system; a machine including a processing tool; an adjustment structure connected to the processing tool and including a multi-angle variable mechanism, so that the processing tool produces variability in multiple working angles, wherein the adjustment structure also includes a surface adaptive mechanism, so that when the correction unit determines that the processing equipment is not flat against a surface of the workpiece, the surface adaptive mechanism and the multi-angle variable mechanism compensate a non-parallel condition between a processing path of the processing tool and a processing surface of the workpiece, wherein the adjustment structure further includes an automatic centering mechanism that links the processing tool to keep the processing tool in a centered position, so that when the correction unit determines that the model input information is unreasonable, the automatic centering mechanism automatically adjusts a position of the processing tool; and a sensor mounted on the machine to be communicatively connected to the electronic device, and the sensor senses the processing signal, and transmits the processing signal to the electronic device, such that the control system can perform the compensation operation, and the machine automatically adjusts a working state of the processing tool on the workpiece based on the compensation parameter.

The present disclosure further provides a control method for manipulating a processing equipment, comprising: providing the aforementioned control system for accessing a built-in information in the database; generating a processing signal when the processing equipment processes a workpiece, so that the input unit obtains a model input information including the processing signal, wherein the correction unit determines whether the model input information is reasonable based on the built-in information, and determines whether the processing tool is flat against a surface of the workpiece; when the correction unit determines that the model input information is reasonable and determines that the processing tool is flat against the surface of the workpiece, the input unit transmits the model input information to the processing unit, so that the processing unit predicts a processing quality of the workpiece according to the model input information and provides the processing quality as a reference information; when the processing unit determines that the processing quality does not meet the requirements, the processing unit transmits the reference information to the calculation unit; calculating, by the calculation unit, a target parameter that is required according to the reference information via the calculation unit, so as to calculate a compensation parameter, so that a compensation operation of the target module generates a target information including the compensation parameter; and based on the target information, automatically adjusting, by the electronic device, a working state of the processing equipment on the workpiece.

DETAILED DESCRIPTIONS

Figure 1:
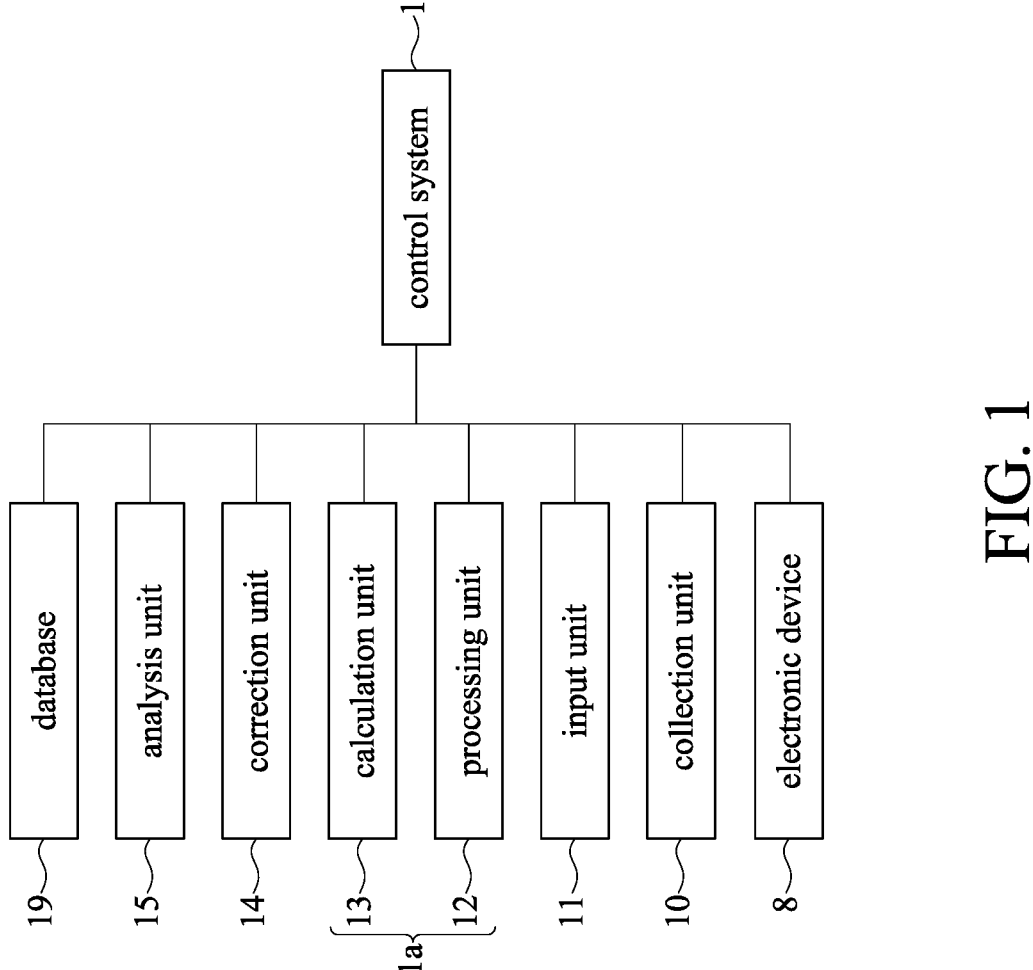
FIG. 1 is a schematic view of a structure configuration of a control system according to the present disclosure.

The following describes the implementation of the present disclosure with examples. Those skilled in the art can easily understand other advantages and effects of the present disclosure from the content disclosed in this specification.

It should be understood that the structures, ratios, sizes, and the like shown in the drawings are used to illustrate the content disclosed in the present disclosure for one skilled in the art to read and understand, rather than to limit the conditions for practicing the present disclosure. Any modification of the structure, alteration of the ratio relationship, or adjustment of the size without affecting the possible effects and achievable proposes should still fall in the range compressed by the technical content disclosed in the present disclosure. Meanwhile, terms such as "upper," "first," "second," "third," "fourth," "one." and the like used herein are merely used for clear explanation rather than limiting practical scope by the present disclosure, and thus, the alteration or adjustment of relative relationship thereof without altering the technical content should be considered in the practical scope of the present disclosure.

FIG. 1 is a schematic view of a structure configuration of a control system 1 according to the present disclosure. As shown in FIG. 1, the control system 1 includes: an electronic device 8, a collection unit 10, an input unit 11 communicatively connected to the collection unit 10, at least one target module 1a communicatively connected to the input unit 11, a correction unit 14 communicatively connected to the collection unit 10, an analysis unit 15 communicatively connected to the target module 1a and a database 19 communicatively connected to the correction unit 14. The collection unit 10, the input unit 11, the target module 1a, the correction unit 14, the analysis unit 15 and the database 19 are configured in the electronic device 8, wherein the target module 1a includes a processing unit 12 communicatively connected to the input unit 11 and a calculation unit 13 communicatively connected to the processing unit 12.

Figure 2A:
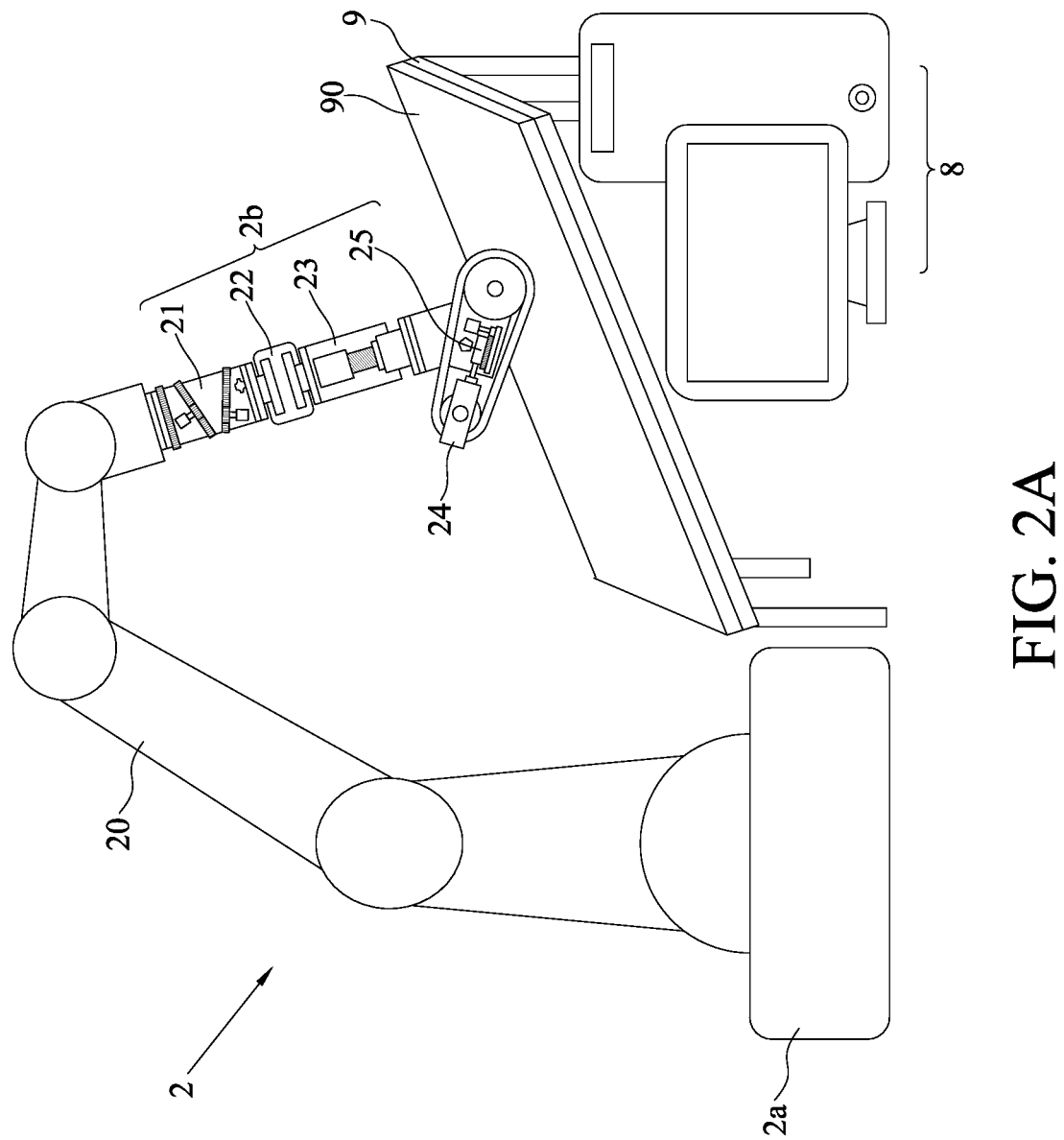
FIG. 2A is a schematic side view of a processing equipment according to the present disclosure.

In the present embodiment, the control system 1 is applied to a processing equipment 2, such as a computer numerical control (CNC) machine tool as shown in FIG. 2A. The target module 1a performs the compensation operation of the processing equipment 2 (for example, the compensation item is force), and the electronic device 8 is a standard configuration of the machine tool or an independent computer (such as a remote computer, a personal computer, a tablet or a mobile phone, etc.), which is equipped with a controller. It should be understood that the electronic device 8 may be configured with other electronic products with functions such as calculation and display of detection results.

Furthermore, the collection unit 10 is used to collect process parameters and/or a plurality of processing signals (such as force signals, acoustic emission signals, vibration signals or other signals) as a model input information, and the collection unit 10 will send the model input information to the input unit 11. The processing equipment 2 will generate the processing signal when processing a workpiece 90, so that the input unit 11 provides the model input information to the processing unit 12, such that the processing unit 12 predicts a processing quality of the workpiece 90 according to the model input information and provides the processing quality as a reference information, and the calculation unit 13 calculates a compensation parameter according to the reference information to form a target information including the compensation parameter.

In addition, as shown in FIG. 2A to FIG. 2D, the processing equipment 2 includes a machine 2a provided with a processing tool 24 and at least one sensor (such as the first to fourth sensors 51, 52, 53, 54) provided on the machine 2a to be communicatively connected to the electronic device 8. In this embodiment, the processing equipment 2 is a grinding equipment or a polishing equipment, and the processing tool 24 is a belt sander.

The machine 2a further comprises a bearing structure 20 as a robotic arm, and an adjustment structure 2b that is located on the bearing structure 20 and connected to the processing tool 24, so that the bearing structure 20 bears the processing tool 24 via the adjustment structure 2b.

The adjustment structure 2b may include a multi-angle variable mechanism 21 connected to the bearing structure 20, a surface adaptive mechanism 22 connected to the multi-angle variable mechanism 21, a force control mechanism 23 connected to the surface adaptive mechanism 22 and the processing tool 24, and an automatic centering mechanism 25 that links the processing tool 24. For example, the multi-angle variable mechanism 21 can be mounted on an end of the robotic arm of the bearing structure 20.

Figure 2B:
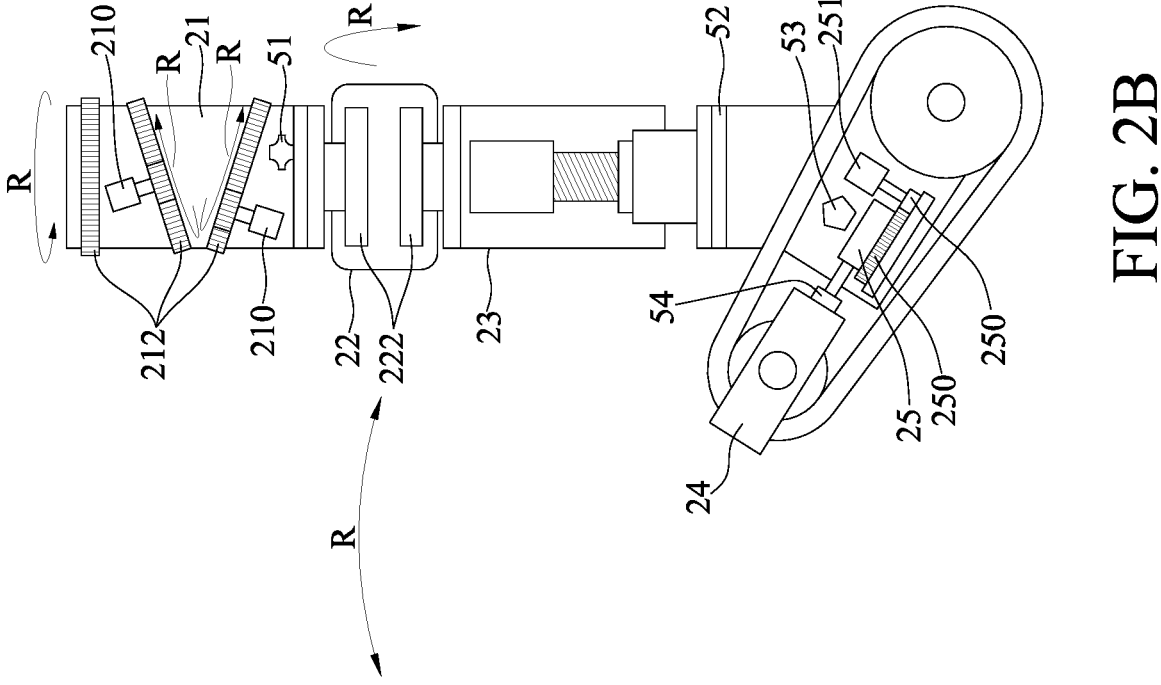
FIG. 2B is a partial schematic view of FIG. 2A.
Figure 2D:
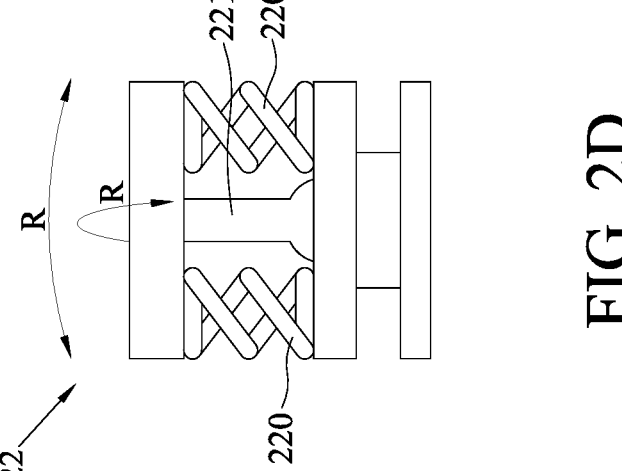
FIG. 2D is a partial schematic view of another viewing angle of FIG. 2B.
Figure 2C:
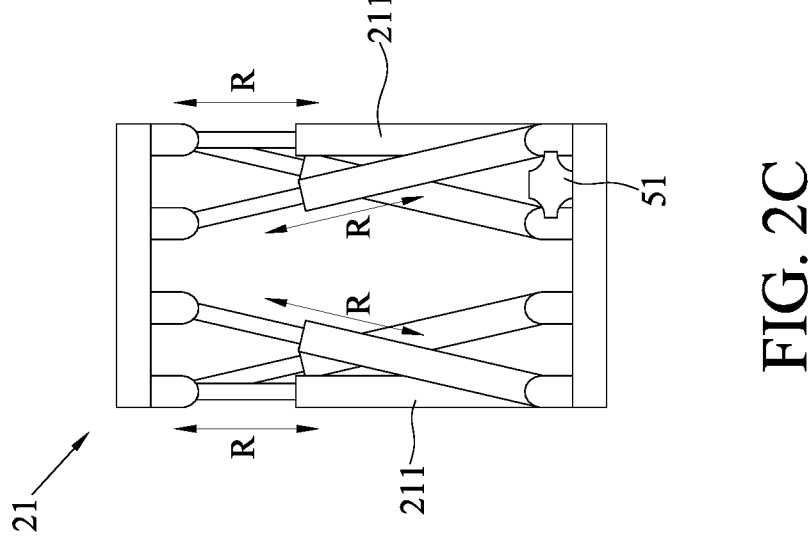
FIG. 2C is a partial schematic view of another viewing angle of FIG. 2B.

The multi-angle variable mechanism 21 comprises components such as at least one motor 210 (as shown in FIG. 2B), at least one damping component 211 having a connecting rod set and a damper (as shown in FIG. 2C), at least one rack (not shown) and at least one gear 212, so that the processing tool 24 produces variability in multiple working angles (moving direction R shown in FIG. 2B and FIG. 2C).

In this embodiment, the multi-angle variable mechanism 21 is configured with a first sensor 51, such as a posture value measurement sensor, to measure a posture value, and transmits the angle information to the electronic device 8 for the control system 1 to calculate the force components at different relative coordinates.

The surface adaptive mechanism 22 comprises components such as at least one spring 220 (as shown in FIG. 2D), at least one universal ball joint 221 (as shown in FIG. 2D), at least one electromagnet 222 (as shown in FIG. 2B) and at least one air pressure (or oil pressure) rod (not shown), so as to compensate for the non-parallel condition between the processing path of the processing tool 24 and the processing surface of the workpiece 90. In other words, the movement manner of the surface adaptive mechanism 22 (the movement direction R shown in FIG. 2B and FIG. 2D) enables the processing tool 24 (or grinding tool) to be flat against the processing surface of the workpiece 90, and fine-tunes the angle with the change of the processing surface.

The force control mechanism 23 is configured with a second sensor 52, such as a force sensor (such as a grinding force sensor), to detect a force applied to the workpiece 90 by the processing tool 24 and use it as force information, and transmits the force information to the electronic device 8.

The processing tool 24 is configured with at least one third sensor 53, such as an acoustic emission sensor (such as a surface voiceprint sensor) and/or a vibration sensor (such as an accelerometer sensor).

The automatic centering mechanism 25 uses a gear 250 and a motor 251 in connection with a fourth sensor 54, such as an abrasive belt tension sensor, so that the fourth sensor 54 detects the tension force of the abrasive belt of the processing tool 24, such that the automatic centering mechanism 25 dynamically and automatically adjusts the angle of the tensioning wheel to keep the processing tool 24 (or its abrasive belt) in a centered position. Therefore, by detecting the force distribution of the abrasive belt on the tension wheel by the fourth sensor 54, the deflection status of the abrasive belt can be known to perform compensation and adjustment actions.

It should be understood that the number of sensors can be configured on the adjustment structure 2b and/or the processing tool 24 according to requirements, so as to facilitate the sensing of the required processing signal and transmit the processing signal to the collection unit 10, but it is not limited to the above.

Therefore, the processing equipment 2 senses the processing signals via the sensors (such as the first to fourth sensors 51, 52, 53, 54), and transmits the processing signals to the electronic device 8, so that the target module 1a of the control system 1 performs the compensation operation of the processing equipment 2, such that the machine 2a automatically adjusts a working state of the processing tool 24 on the workpiece 90 based on the compensation parameter.

Figure 3A:
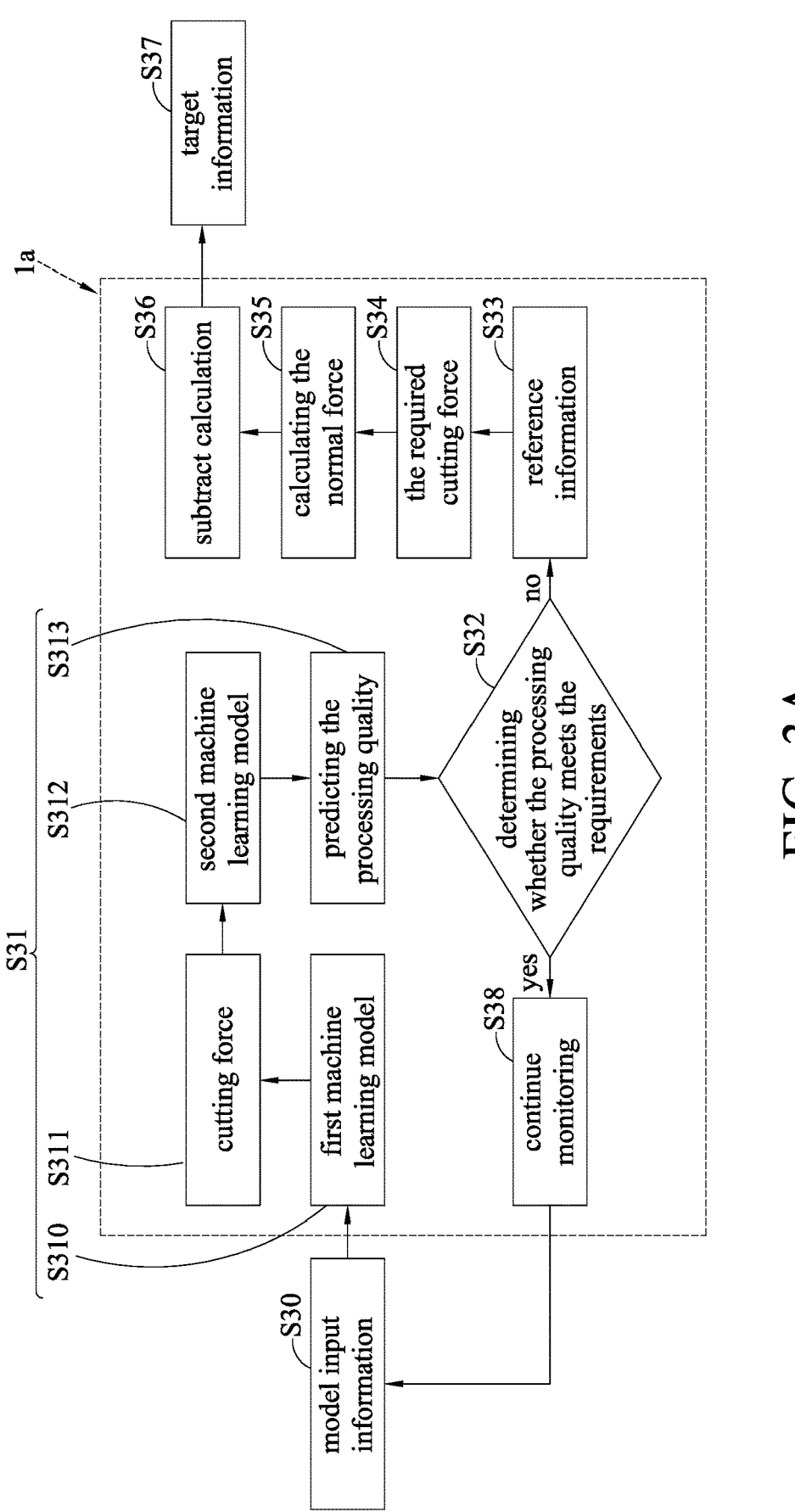
FIG. 3A is a flow chart of a control method according to the present disclosure.

FIG. 3A is a flow block diagram of a control method for controlling the processing equipment 2 according to the present disclosure. In this embodiment, the control method includes a compensation operation, and the compensation item is a force (such as the force exerted by the processing tool 24 on the workpiece 90), so the processing signal includes a force signal.

In step S30, the processing signal is generated when the processing equipment 2 processes a workpiece 90, so that the input unit 11 obtains a model input information including the processing signal.

Figure 3B:
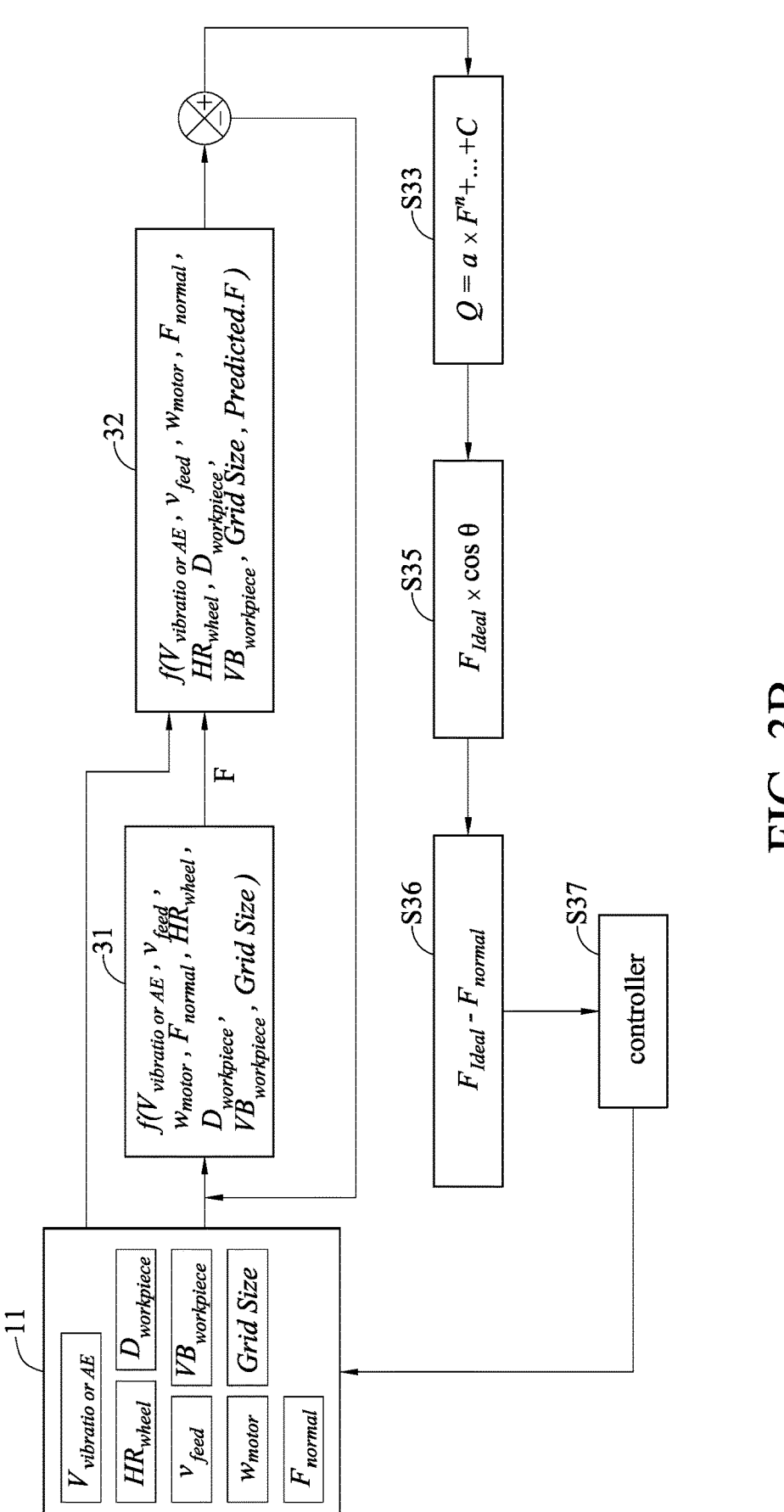
FIG. 3B is a block diagram of a calculation process of FIG. 3A.

In this embodiment, the model input information includes a plurality of different types of processing signals (such as the signal $V_{AE}$ of the acoustic emission sensor, the signal $V_{vibration}$ of the vibration sensor and the force signal $F_{normal}$ shown in FIG. 3B) and process parameters (such as feed speed v, unprocessed workpiece surface quality D, grinding motor speed w, contact wheel hardness HR, workpiece material VB, and Grid Size as shown in FIG. 3B).

In step S31, the model input information is transmitted to the processing unit 12 via the input unit 11, so that the processing unit 12 predicts the processing quality of the workpiece 90 according to the model input information and provides it as reference information. For example, the processing unit 12 includes at least one machine learning model to calculate the model input information to obtain the reference information, so the prediction process of the processing unit 12 is as follows:

In step S310 to step S311, a first machine learning model 31 receives the model input information (as shown in FIG. 3B) to calculate a cutting force F (as shown in FIG. 3B) as a first parameter.

In the present embodiment, the first machine learning model 31 is trained using artificial intelligence models such as DNN (Deep Neural Network) or CNN (Convolutional Neural Network), to form a model that reflects the correlation between the wear degree of the consumables (such as the abrasive belt of the processing tool 24) and the cutting force F.

In step S312, the first parameter (cutting force F) is transmitted to a second machine learning model 32, and the second machine learning model 32 also receives the model input information, as shown in FIG. 3B.

In this embodiment, the second machine learning model is also trained using artificial intelligence models such as DNN or CNN to form a model that reflects the correlation between the cutting force F and the processing quality of the workpiece 90.

In step S313, the second machine learning model 32 calculates the first parameter (cutting force F) together with the model input information to obtain a prediction result of the processing quality of the workpiece 90 and provides it as the reference information.

Figure 3C:
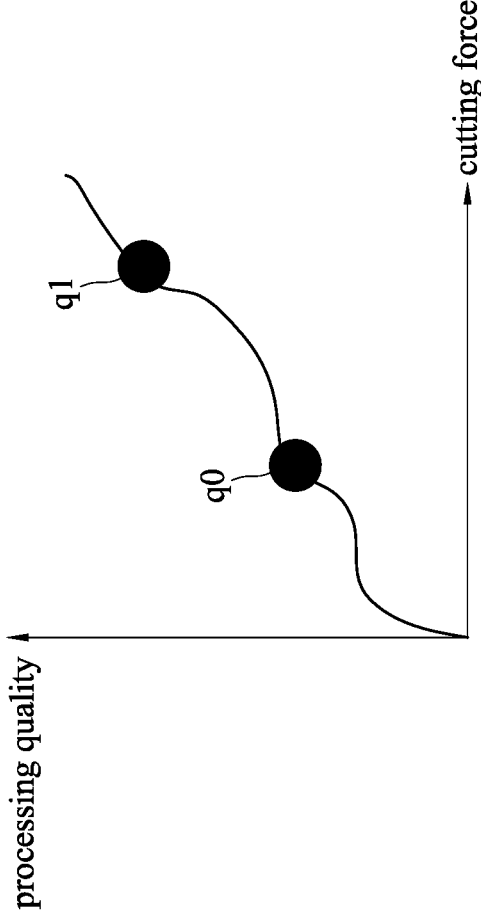
FIG. 3C is a graph of the reference information in FIG. 3A.

In step S32, the processing unit 12 determines whether the processing quality of the workpiece 90 meets the requirements. For example, if the processing unit 12 determines that the processing quality meets the requirements, the processing unit 12 will continue to monitor the degree of wear and perform predictive actions (as shown in step S38). On the other hand, if the processing unit 12 determines that the processing quality does not meet the requirements, such as the reference information shown in FIG. 3C (which includes a graph of the correlation between the cutting force F and the processing quality of the workpiece 90), the reference information is transmitted to the calculation unit 13 by the processing unit 12 (as shown in step S33), wherein the reference information presents a bad parameter point q0 of the current quality state and an expected parameter point q1 of the ideal quality state.

In this embodiment, the quality parameter Q of the reference information is the state after each cutting, as in step S33 shown in FIG. 3B, the formula is $Q=a \times F^n + \ldots + C$, wherein $F^n$ is the nth power of the force, n is the number of powers (it can be integer or fraction), a is the weighted value, and C is a constant.

In step S34, the calculation unit 13 calculates the required ideal cutting force $F_{Ideal}$ according to the reference information, and provides it as a second parameter.

In step S35, according to the second parameter (ideal cutting force $F_{Ideal}$), the calculation unit 13 calculates a normal force, that is, $F_{Ideal} \times \cos \theta$ (step S35 shown in FIG. 3B), which is provided as a target parameter.

In step S36, the calculation unit 13 performs subtraction calculation, that is, the calculation unit 13 subtracts the target parameter from the value of the processing signal (the force signal $F_{normal}$) to obtain a compensation parameter (such as the value of a compensation force).

Therefore, the calculation unit 13 can calculate the compensation parameter according to the reference information, so that the compensation operation of the target module 1a generates (or outputs) a target information including the compensation parameter.

In step S37, the calculation unit 13 outputs target information including the compensation parameter (such as the value of the compensation force) to the controller of the electronic device 8 (step S37 shown in FIG. 3B).

Therefore, based on the target information, the electronic device 8 can automatically adjust a working state of the processing equipment 2 on the workpiece 90.

Figure 4:
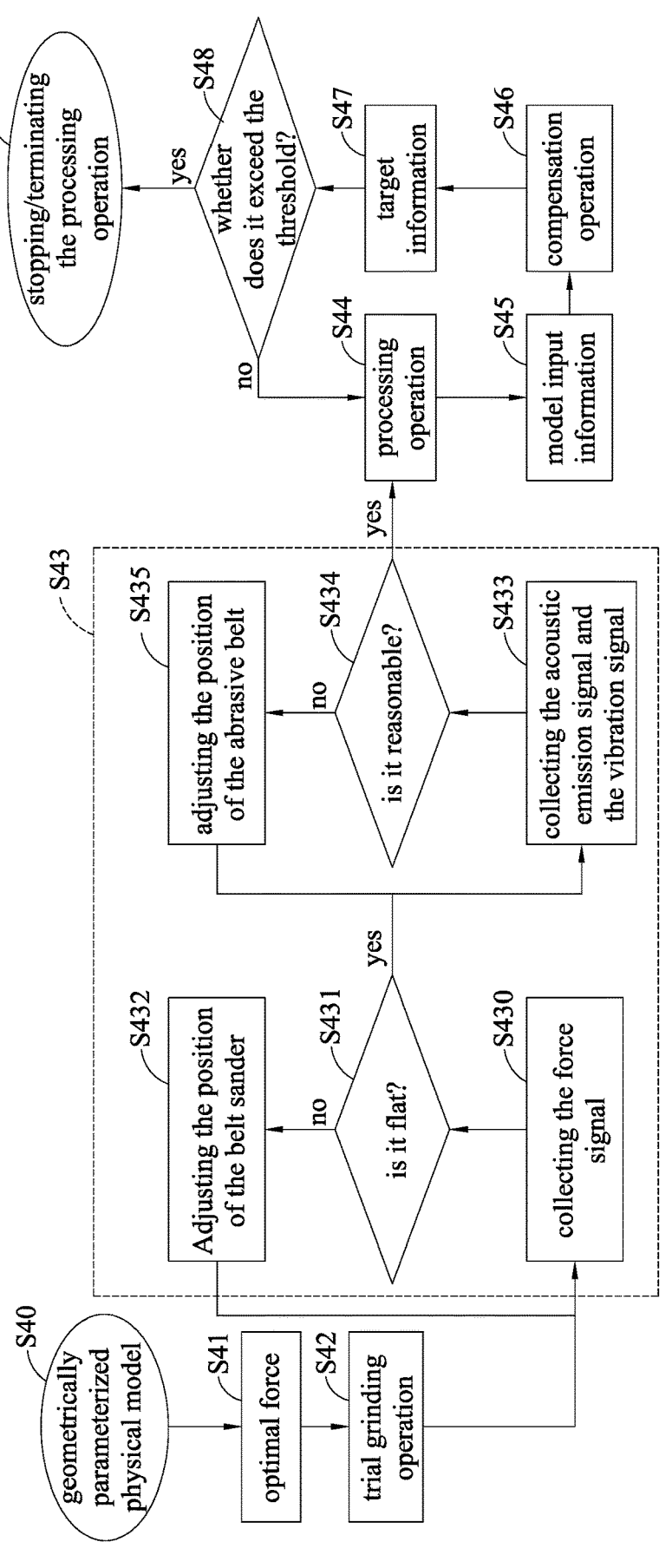
FIG. 4 is a flow chart of another embodiment of the control method according to the present disclosure.

FIG. 4 is a flow block diagram of a control method for controlling the processing equipment 2 according to the present disclosure, which includes correction operations and compensation operations.

In step S40, a geometrically parameterized physical model is preset in the database 19 of the control system 1 to access the optimal force and its related comparison parameters (such as acoustic emission signals and vibration signals), which can be considered as built-in information.

In step S41, the optimal force is set as a comparison force.

In step S42, a trial grinding operation is carried out. The processing equipment 2 grinds a workpiece 90 with its processing tool 24, and the workpiece can be placed on a correction platform 9, as shown in FIG. 2A.

In step S43, a correction operation (including steps S430~S435, as described later in detail) is performed.

In step S430, the force signal measured by the sensor of the trial grinding operation is collected by the collection unit 10.

In step S431, according to the comparison force and the force signal measured in step S430, the correction unit 14 determines whether the abrasive belt of the processing tool 24 is flat against the surface of the workpiece 90 on the correction platform 9. For example, if the correction unit 14 determines that the two are not flat against to each other, the position of the processing tool 24 is automatically adjusted by the surface adaptive mechanism 22 and the multi-angle variable mechanism 21 (as shown in step S432), and then the operations from step S430 to step S431 are carried out until the two are flat against to each other. On the other hand, if the correction unit 14 determines that the two are flat against to each other, the collection unit 10 continues to collect the acoustic emission signals and vibration signals measured by the sensor of the trial grinding operation (as shown in step S433).

In step S434, according to the comparison parameters inputted into the built-in information in the database 19, the correction unit 14 determines whether the acoustic emission signals and the vibration signals measured in step S433 are reasonable. For example, if the correcting unit 14 determines that they are unreasonable, the position of the abrasive belt of the processing tool 24 is automatically adjusted by the automatic centering mechanism 25 (as shown in step S435). On the other hand, if the correction unit 14 determines that they are reasonable, processing (such as grinding and/or polishing) operations can be performed (as shown in step S44), so that the collection unit 10 can send the corrected model input information to the input unit 11.

In step S45, step S30 as shown in FIG. 3A is performed (the input unit 11 obtains a model input information including processing signal).

In step S46, the compensation operation as shown in FIG. 3A is performed.

In step S47, step S37 as shown in FIG. 3A is performed (the calculation unit 13 outputs a target information including compensation parameter).

In step S48, the analysis unit 15 performs an analysis operation to analyze whether the compensation operation makes the processing equipment 2 operate normally.

In this embodiment, the analysis unit 15 determines whether the wear degree of the abrasive belt of the processing tool 24 exceeds a threshold value. For example, if the analysis unit 15 determines that the wear degree of the abrasive belt does not exceed the threshold value, the processing operation of step S44 can be continued, so that the compensation operation can be continuously performed by the target module 1a. On the other hand, if the analysis unit 15 determines that the wear degree of the abrasive belt exceeds the threshold value, the processing operation needs to be stopped or terminated (as shown in step S49).

Therefore, the control method according to embodiments of the present disclosure uses a correction operation to form a more accurate processing signal (the acoustic emission signal, the vibration signal and the force signal) as the model input information, so that the compensation operation of the target module 1a can generate a more appropriate compensation parameter.

Figure 5:
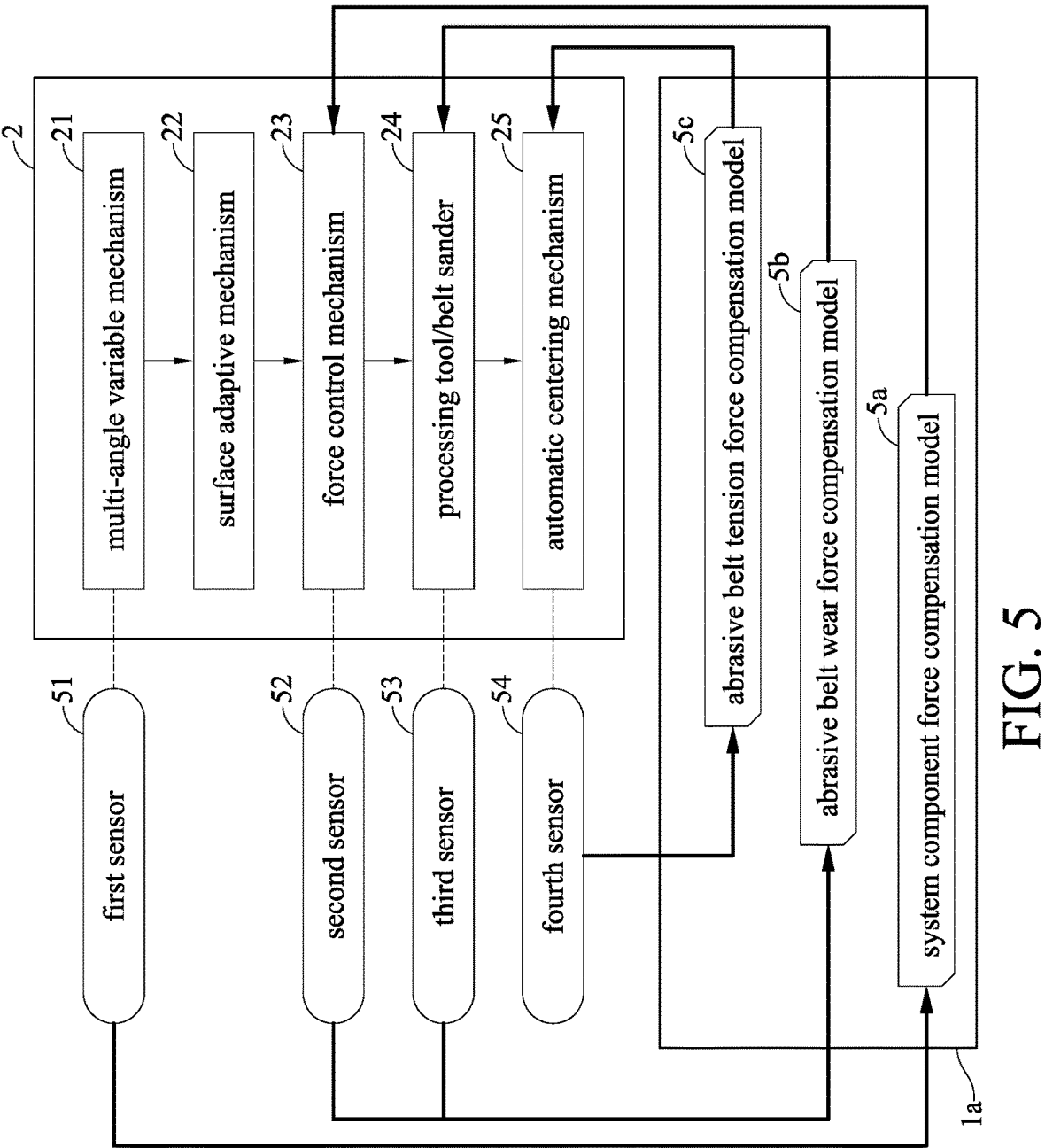
FIG. 5 is a schematic view of a structure configuration of another embodiment of the control system according to the present disclosure

FIG. 5 is a schematic view of a structure configuration of another embodiment of the control system 1 according to the present disclosure. As shown in FIG. 5, the target module 1a of the control system 1 includes a plurality of compensation models 5a, 5b, 5c to perform compensation operations of various compensation items.

In the present embodiment, the processing tool 24 can be a belt sander, and the plurality of compensation models 5a, 5b, and 5c include a system component force compensation model 5a, an abrasive belt wear force compensation model 5b, and an abrasive belt tension force compensation model 5c.

The system component force compensation model 5a is communicatively connected to the first sensor 51 for the target module 1a to provide a compensation parameter to the controller of the electronic device 8 to adjust the force control mechanism 23.

The abrasive belt wear force compensation model 5b is communicatively connected to the second sensor 52 and the third sensor 53 for the target module 1a to provides the compensation parameter to the controller of the electronic device 8 to adjust the processing tool 24.

The abrasive belt tension force compensation model 5c is communicatively connected to the fourth sensor 54 for the target module 1a to provide the compensation parameter to the controller of the electronic device 8 to adjust the automatic centering mechanism 25.

It should be understood that there are many types of processing equipment and are not limited to the above.

Therefore, the related compensation items of the control system 1 are also various, such as speed, acceleration, moving distance or others, which can be set according to requirements, and there is no special limitation.

To sum up, in the processing equipment 2 and the control system 1 thereof and the control method thereof according to the present disclosure, the target module 1a is used as a compensation module, and is in connection with a processing signal collected during processing operations (such as the vibration signal, the acoustic emission signal, the force signal) and even a process parameter (such as motor speed, feed speed, contact wheel hardness, workpiece material, grid size, etc.), which are both used as the model input information, so as to predict the processing quality (even monitor the degree of wear), thereby calculating the target information including the compensation parameter. Therefore, compared with the prior art, the present disclosure can avoid the problem that the processing quality of the workpiece 90 is inconsistent due to factors such as the wear (such as abrasive belt wear for grinding) of the processing tool 24 or the variation of the workpiece 90 during the automatic processing (such as grinding) operation, so as to improve the stability of processing quality and increase the service life of the processing tool 24.

The foregoing embodiments are used for the purpose of illustrating the principles and effects only rather than limiting the present disclosure. Anyone skilled in the art can modify and alter the above embodiments without departing from the spirit and scope of the present disclosure. Therefore, the range claimed by the present disclosure should be as described by the accompanying claims listed below.

What is claimed is:

1. A processing equipment generating a processing signal when processing a workpiece, comprising:
   a control system comprising:
      an electronic device;
      an input unit configured in the electronic device and having a model input information including the processing signal;
      a correction unit configured in the electronic device and used to determine whether the processing equipment is flat against a surface of the workpiece;
      a database configured in the electronic device and storing built-in information, so that the correction unit determines whether the model input information is reasonable based on the built-in information; and
      a target module configured in the electronic device to carry out a compensation operation of the processing equipment, and including a processing unit communicatively connected to the input unit and a calculation unit communicatively connected to the processing unit, so that the input unit provides the model input information to the processing unit for the processing unit to predict a processing quality of the workpiece according to the model input information and provides the processing quality as a reference information, and the calculation unit calculates a target parameter that is required according to the reference information to calculate a compensation parameter to form a target information including the compensation parameter,
   a machine including a processing tool;
   an adjustment structure connected to the processing tool and including a multi-angle variable mechanism, so that the processing tool produces variability in multiple working angles, wherein the adjustment structure also includes a surface adaptive mechanism, so that when the correction unit determines that the processing equipment is not flat against a surface of the workpiece, the surface adaptive mechanism and the multi-angle variable mechanism compensate a non-parallel condition between a processing path of the processing tool and a processing surface of the workpiece, wherein the adjustment structure further includes an automatic centering mechanism that links the processing tool to keep the processing tool in a centered position, so that when the correction unit determines that the model input information is unreasonable, the automatic centering mechanism automatically adjusts a position of the processing tool; and
   a sensor mounted on the machine to be communicatively connected to the electronic device, and the sensor senses the processing signal, and transmits the processing signal to the electronic device, such that the control system performs the compensation operation, and the machine automatically adjusts a working state of the processing tool on the workpiece based on the compensation parameter.

2. The processing equipment of claim 1, wherein the processing signal is a force signal.

3. The processing equipment of claim 1, wherein the compensation parameter is a value of a compensation force.

4. The processing equipment of claim 1, wherein the calculation unit calculates a target parameter that is required according to the reference information, and subtracts the target parameter from a value of the processing signal to obtain the compensation parameter.

5. The processing equipment of claim 1, wherein the processing unit includes at least one machine learning model to calculate the model input information to obtain the reference information.

6. The processing equipment of claim 1, further comprising a collection unit, which is configured in the electronic device and communicatively connected to the input unit and the correction unit, configured for collecting the model input information and sending the model input information to the input unit.

7. The processing equipment of claim 1, further comprising an analysis unit, which is configured in the electronic device and communicatively connected to the target module, configured for analyzing whether the compensation operation makes the processing equipment operate normally.

8. The processing equipment of claim 1, wherein the target module includes a plurality of compensation models to perform compensation operations for various items.

9. The processing equipment of claim 1, wherein the processing tool is a belt sander.

10. The processing equipment of claim 1, wherein the machine further includes a bearing structure for bearing the processing tool.

11. The processing equipment of claim 1, wherein the adjustment structure further includes a force control mechanism connected to the processing tool, so that the sensor is configured on the force control mechanism to detect a force exerted by the processing tool on the workpiece.

12. The processing equipment of claim 1, wherein the at least one sensor is a plurality of sensors, which are configured on the adjustment structure and/or the processing tool.

13. The processing equipment of claim 1, wherein the sensor is a posture value measurement sensor, a force sensor, an acoustic emission sensor or a vibration sensor.

14. A control method for manipulating a processing equipment, comprising:
   providing a control system for accessing a built-in information in a database, wherein the control system includes: an electronic device; an input unit configured in the electronic device; a correction unit configured in the electronic device; the database configured in the electronic device and storing the built-in information; and a target module configured in the electronic device to carry out a compensation operation of the processing equipment, and including a processing unit communicatively connected to the input unit and a calculation unit communicatively connected to the processing unit;
   generating a processing signal when the processing equipment processes a workpiece, so that the input unit obtains a model input information including the processing signal, wherein the correction unit determines whether the model input information is reasonable based on the built-in information, and determines whether the processing equipment is flat against a surface of the workpiece;
   when the correction unit determines that the model input information is reasonable and determines that the processing equipment is flat against the surface of the workpiece, the input unit transmits the model input information to the processing unit for the processing unit to predict a processing quality of the workpiece according to the model input information and provides the processing quality as a reference information;
   when the processing unit determines that the processing quality does not meet the requirements, the processing unit transmits the reference information to the calculation unit;

calculating, by the calculation unit, a target parameter that is required according to the reference information, so as to calculate a compensation parameter, so that a compensation operation of the target module generates a target information including the compensation parameter; and based on the target information, automatically adjusting, by the electronic device, a working state of the processing equipment on the workpiece.

15. The control method of claim 14, wherein the processing signal is a force signal.

16. The control method of claim 14, wherein the compensation parameter is a value of a compensation force.

17. The control method of claim 14, wherein the calculation unit calculates the target parameter that is required according to the reference information, and subtracts the target parameter from a value of the processing signal to obtain the compensation parameter.

18. The control method of claim 14, wherein the processing unit includes at least one machine learning model to calculate the model input information to obtain the reference information.

19. The control method of claim 14, wherein the control system further comprises a collection unit, which is configured in the electronic device and communicatively connected to the input unit and the correction unit, configured for collecting the model input information and sending the model input information to the input unit.

20. The control method of claim 14, wherein the control system further comprises an analysis unit, which is configured in the electronic device and communicatively connected to the target module, configured for analyzing whether the compensation operation makes the processing equipment operate normally.

21. The control method of claim 14, wherein the target module includes a plurality of compensation models to perform compensation operations for various items.

* * * * *